INVENTOR
ORLO K. HIBBARD
BY Miller Morris & Pappas
ATTORNEYS

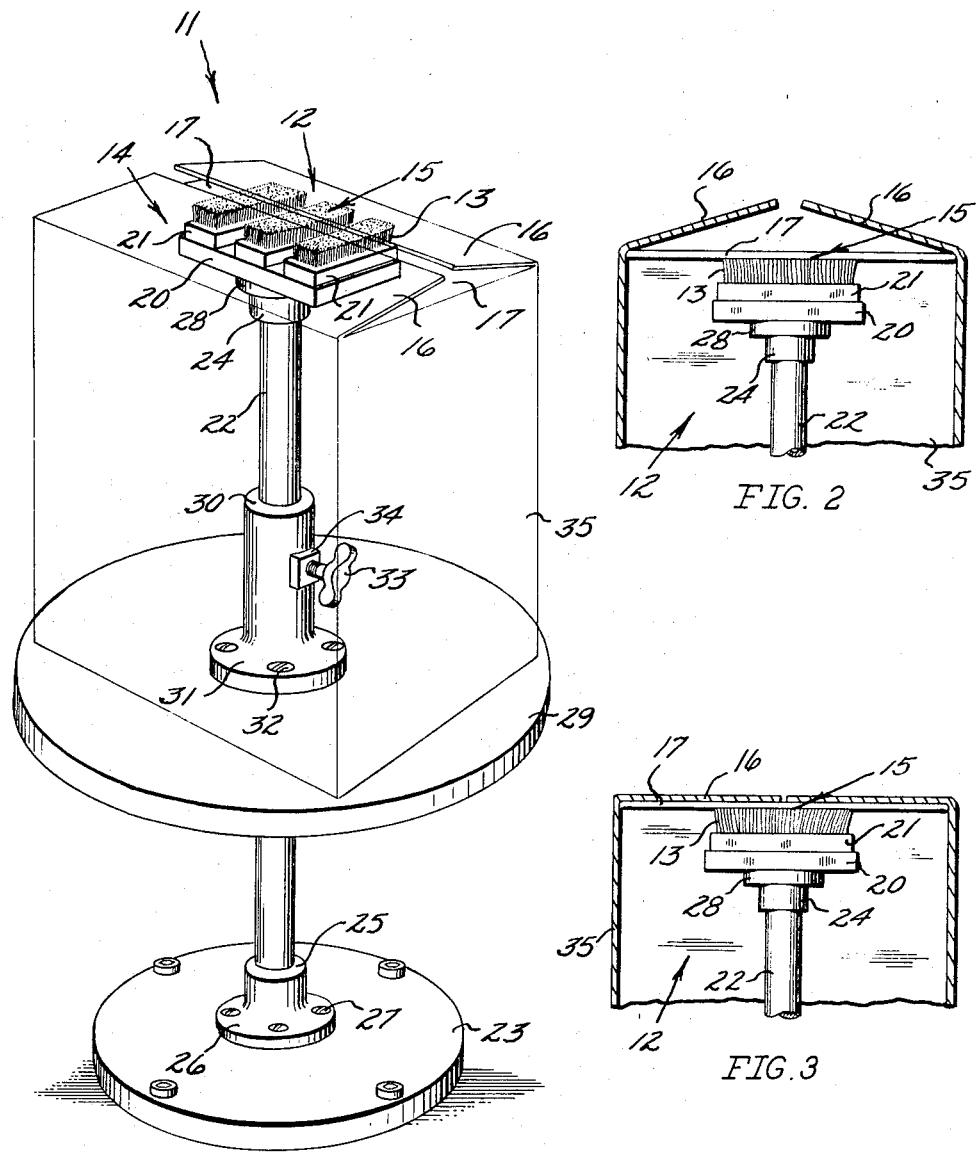

United States Patent Office 3,354,539
Patented Nov. 28, 1967

3,354,539
METHOD AND APPARATUS FOR BLIND-SIDE SUPPORTED STAPLING
Orlo K. Hibbard, 11320 Britton Road, Byron, Mich. 48418
Filed Jan. 6, 1965, Ser. No. 423,744
7 Claims. (Cl. 29—432.1)

The present invention relates to a back-up device for use in blind fastening operations.

Fastening together of layers of stock or material is commonly done in one of two ways. In one method the fastening tool is applied to one side only of the plural layers of material or stock to be fastened. The fastener element, for example a staple, rivet, or the like, is then forced through the layers of stock or material whereupon the fastener is then clinched or upset into its final configuration securing the plural layers of material together. This clinching of the fastener element, wherein the fastener element is often a staple, is accomplished by bringing the fastener element into direct forcible engagement with the face of a rigid anvil which finally shapes or clinches the fastener element on the blind side of the material, that is, on the side of the material opposite to the side against which the fastening tool is applied. Subsequent to this clinching, the fastening tool and rigid anvil are moved away from the stock leaving the fastener element or staple in final clinched position. The fastener thus holds together the stock layers or material. The rigid anvil against which the fastener or staple is forcibly engaged is usually integral with and connected to the main body of the fastening tool or instrument. Such an arrangement is commonly seen in light weight home or desk model paper staplers.

A second approach, and the approach to which the present invention is directed, uses well known devices in which the fastening tool and fastener element are applied from one side of the material layers desired to be fastened. No rigid clinching anvil or back-up support of any kind is used. In many of these devices both the fastener or staple and clinching jaws are simultaneously driven through the material layers to be fastened. Then the clinching of the fastener is accomplished by the clinching jaws acting through the layers of stock or material. This action takes place on the blind side of the stock material after penetration of the stock material by the jaws and fastener element. Subsequent to the clinching of the fastener or staple the jaws are withdrawn from the material layers along with the fastening tool, leaving the fastener behind imbedded in the material layers, holding the material layers securely together as desired.

Hereinafter, in this statement of the invention and in the description following, the first above described method will be called the "anvil-clinching" method and the second above described method will be called the "blind-stitching" method.

A common problem in the blind-stitching method of fastening or stapling is that, because no back-up support is provided on the blind side of the stock layers or materials, the materials are not restrained from moving away from the fastening tool both when the tool is urged against the materials and when the fastening element and clinching jaws are driven into the materials. The result of this displacement of the materials is that the clinching jaws and/or fastener element fail to penetrate completely through the materials or stock layers. This causes incomplete or ineffective fastening of the materials or stock layers, a problem which is solved by the invention hereinafter described.

My invention involves the novel use of a resilient back-up device, which is non-integral with and disconnected from the fastening tool or stapler, and thus provides a solution to the above described problem in the blind-stitching method of fastening or stapling.

The principal object of my invention is to provide a resilient surface as a back-up support for materials or layers of stock to be fastened in a blind-stitching method, such that the penetration and manipulation by the clinching jaws and fastener element will not be obstructed on the blind side of the materials or stock layers while such materials or stock layers are being supported from their blind side by the resilient back-up support.

A second object of my invention is the provision of a novel device which increases speed and efficiency in the fastening operation of the blind-stitching type, through the elimination of fastening failures caused by deformation or displacement of the materials or stock layers.

Another object of my invention is to provide a very useful back-up device which is extremely economical to fabricate, use, and maintain.

Still another object of my invention is to disclose a back-up support method which is both simple and economical to practice.

Other objects, including simplicity and efficiency with attendant improved support, for a variety of blind side operations, will be apparent to those skilled in the art as the description proceeds.

In the drawings:

FIGURE 1 is a perspective view of the back-up device of the present invention illustrating the support cushion, elongate elevational post, and base, with positioning platform slidably attached to the elevational post.

FIGURE 2 is a front elevational partial section view of a support cushion, with a section taken through a carbon in position for having its bottom flaps fastened while receiving back-up support from the support cushion in accord with the present invention.

FIGURE 3 is a front elevation partial section view of a support cushion as in FIGURE 2 except that the outer bottom flaps of the box are folded down into position for being fastened to the inner flaps which are resting against the supporting surface of the support cushion.

General description

Figure 4:
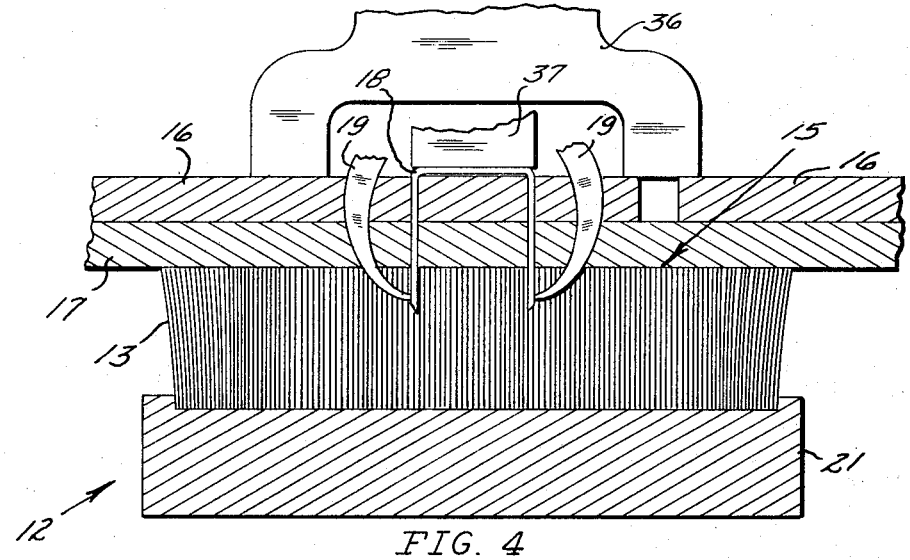
FIGURE 4 is a front elevational partial section view of a spicular support bed, in accord with the present invention, backing-up plural layers of stock from the blind side of the layers of stock which are shown as penetrated by the staple and clinching jaws of a blind-stitching type stapler.

In general a bed of parallel, spaced apart, resilient, spicular elements is arranged to form a bearing or support surface, with all of the lower ends of the spicular elements being secured to a holding platform. The other, or free, ends of the spicular elements collectively generate a support surface comprised of the discrete points defined by the upper free ends of the vertical spicular elements. This point generated support surface is thus spaced from the holding platform at a distance depending upon the length of the spicules. Support is thereby offered by this point generated surface to objects placed upon it, such as material or stock layers to be fastened, in much the same way that a bed of nails supports a Hindu fakir, except that the "nails" or spicules of the present invention are resilient, springy, and bendable, while still providing axial resistance to loads placed on the bed. The spicules are spaced at uniform intervals in sufficient density to collectively provide bearing strength necessary to support objects placed upon it, but separated sufficiently to allow the spicules to buckle and bend under locally applied stress. In particular the spicules should give way to transverse forces applied to the spicules beneath the support surface. Such strength characteristics of the spicular support bed are necessary to enable it to support material or layers of stock being subjected to blind manipulation and at the same time to accommodate passage and manipulation of the fastener element and clinching jaws on the blind side of the material or stock layers through which the fastener element and clinching jaws penetrate.

One or more spicular support beds are attached to a platen to form a support cushion, which support cushion is connected to the upper end of an elongate elevational post which holds the support cushion at a height convenient for the individual who operates the fastening tool. The elevational post is secured at its lower end to a base having a large diameter and also having sufficient weight to impart stability to the entire back-up device. A positioning table is slidably attached to the elevational post so as to be adjustable to different vertical spacing from the support cushion in order to allow positioning of various sizes of stock to be fastened, for example cartons or boxes of varying depth.

The bottom of a box is formed by folding four flaps into a plane perpendicular to all four sides of the box and then fastening them together. The positioning table is vertically adjusted so that when a box is dropped upside down on the table the bottom of the box, formed by the folded flaps as described above, has its inside surface resting flatly on top of the support surface. The support surface then backs-up the bottom of the box from inside against the downward force of the stapler and staple which are applied to the bottom forming flaps from above on the outside of the box.

The table, in addition to its positioning function described here, may also serve as a table for general use in holding tools, supplies, and the like.

*Specific description*

Referring to the drawings and particularly to FIGURE 1, a complete back-up device 11 is shown. The back-up device 11 includes a support cushion 12, an elongate elevational post 22, an adjustable positioning table 29, and a base 23. FIGURE 1 also shows in phantom-line a carton 35. The end forming flaps 16 and 17 of the carton 35 receive back-up support from the support cushion 12, as will be seen.

The uppermost component of the back-up device 11 is the support cushion 12 which consists of a plurality of upward pointing resilient spicular elements 13 having their lower ends rooted to a platform 14.

The spicules 13 are all parallel to one another and perpendicular to the platform 14, to which their lower ends are affixed. The spicules 13 are long dart-like elements spaced relatively closely together at uniform intervals and extend upward to where their upper ends, or tips, collectively form a point-generated plane which operates as a support surface 15. The spicules 13 act as a multitude of slender columns which collectively have sufficient strength to support objects undergoing a fastening operation, for example, stock layers like the box flaps 16 and 17 shown in FIGURE 1. The support surface 15 is flat and mates against substantially flat areas of the objects such as flaps 16 and 17 of carton 35, which it backs up or supports. Objects to be supported for fastening engage the support surface 15 in an area relationship with the result that the weight of the object is distributed in a relatively uniform manner over the total support surface 15. In my preferred embodiment as shown in FIGURE 1 the flaps 16 and 17 are seen to cover the entire support surface 15 and therefore all the spicular columns 13 are subjected to axial stress when the flaps 16 and 17 are pressed down against the surface 15 by their own weight and/or an applied force transverse to the plane of folded flaps 16 and 17. Thus the load upon the surface 15 is widely distributed and no spicule 13 is stressed enough to deflect any appreciable amount. However, the spicules 13 are not so dense in grouping and stiff as to make the surface 15 a locally rigid one. When fastening instrumentalities such as the staples 18 and clinching jaws 19 of FIGURE 4 penetrate the support surface 15 the resilient spicular columns 13 deflect locally. The local deflection occurs because the number of stressed spicules 13 is insufficient to resist the locally applied force. The spicules 13 also deflect locally to permit transverse motion of the spicules 13 in the region penetrated by the fastening instrumentalities. Such a transverse motion is exemplified by the inward swing of the clinching jaws 19 and the bending of the staple 18, both of which actions are seen to have occurred in FIGURE 5. Since all of these deflections are localized to the area deformed by the penetrating instrumentalities, a sufficient number of spicules 13 remains undeflected to give continued column support to the flat object (carton 35) resting on the support surface 15. The local deflections of the spicules 13 allow the necessary sub-surface manipulations of the fastening tool and fastener element to take place without interference or damage to tool or fastener. The deflected spicules 13 are undamaged and return to position upon completion of the operation.

In the preferred embodiment of FIGURE 1 the region of support surface 15 is separated into plural rectangular blocks as represented by pads 21 and the spicules 13 supported thereby. The point-generated surfaces of the blocks are coplanar and thus collectively form the large, compound support surface 15. The total area of the surface 15 is thus equal to the sum of the surface areas of the blocks. It will be understood that either a single large block or plural blocks may be used, but in the specific embodiment shown, replacement, as a consequence of wear, is greatly simplified. Moreover, the embodiment shown allows an economy in replacement because only worn blocks need be replaced. The platform 14 consists of a flat platen 20 to the upper face of which are attached separate pads 21. To each pad 21 is attached a plurality of spicules 13, as by imbedment of the lower ends of the spicules 13 into the pads 21.

It will be appreciated that the support cushion 12 may be variously constructed and shaped. For example instead of having pads 21 attached to a platen 20 the pads 21 could be constructed integrally with the platen 20, or the pads 21 could be omitted altogether in which case the spicules 13 would be imbedded directly into the platen 20, or other device serving as the platform 14. Furthermore it is apparent that any number of spicular blocks could be selected. As already mentioned a single block could be used. Moreover the rectangular shape of the blocks 21 is not essential to the usefulness of the present invention. Other arbitrary shapes of the surface 15 which possess a registering plane of supporting area could be substituted for the shapes shown.

The elongate elevational post 22 is attached at its upper end to the support cushion 12 and at its lower end to the large heavy base 23. The connecting means used in each case are socket connectors 24 and 25 which may be threaded and both of which are best appreciated by reference to the lower socket connector 25. The female threaded socket connector 25 is seen receiving the male threaded lower end of the elevational post 22 which is screwed into the connector 25. The connector 25 is flanged. The flange 26 is provided with holes through which are passed fasteners such as screws 27. The screws 27 fasten the base tightly against the face of the flange 26 on the connector 25. In the same manner the upper socket connector 24, with flange 28, fastens the upper end of the elevational post 22 to the support cushion 12. The face of the flange 28 is secured by screws (not shown) tightly against the lower face of the platen 20. While screws are given as the means of fastening the post 22 to both the base 23 and support cushion 12, it will be appreciated that other fastening means such as welding, brazing, or integral construction can be used. The form illustrated greatly facilitates assembly and disassembly of the entire back-up device 11.

An adjustable table 29 is attached to the elevational post 22 between the base 23 and the support cushion 12, by means of a sliding hollow tubular connector 30 which connector 30 slides matingly up and down the post 22. The table 29 is preferably circular. The post 22 passes through a center opening (not shown) in the table 29. At its lower end the sliding connector 30 spreads into a flange 31 having openings therethrough to receive screws 32 which secure the positioning table 29 in flush contact against the face of the flange 31. The positioning table 29 is held at a selected elevation by a winged set screw 33 which is screwed into a boss 34 on the side of the sliding connector 30. A threaded hole (not shown) in the boss 34 passes through one side of the connector 30. The set screw 33 is turned until tight engagement between the set screw 33 and post 22 is accomplished. This tight engagement, by frictional resistance, holds the positioning table 29 at any selected elevation within the limits defined by interference with the upper socket connector 24 and lower socket connector 25. It will be appreciated by reference to FIGURE 1 that the table 29 may be inverted so that the tubular sliding connector 30 is beneath the table 29. It will be appreciated further that means other than the sliding connector 30 and winged set screw 33 could be used for adjustably attaching the table 29 to the post 22. For example, a plurality of holes (not shown) through the post 22 could be spaced at vertical intervals along its length and the table 29 could then be supported by a pin (not shown) inserted through a selected hole at the desired level. Other means for adjustably securing the table 29 to the correct selected position on the post 22 will be apparent to those skilled in the art.

The operation of the structure seen in FIGURE 1 is best understood by reference to the FIGURES 2 through 6, inclusive. In FIGURE 1 the positioning of carton or box 35 is shown in phantom-line.

The spicular elements 13 are shown in FIGURE 1 giving support to two pairs of closure flaps 16 and 17 of a carton 35. These flaps when folded inwardly two at a time form the closed end of the carton 35 which end ultimately and usually serves as the bottom of the carton 35. For longer or shorter boxes than the carton 35 shown, the positioning table 29 would be accordingly lowered or raised to cause the plane established by the flaps 16 and 17 to coincide with the plane of the spicular support surface 15.

Figure 5:
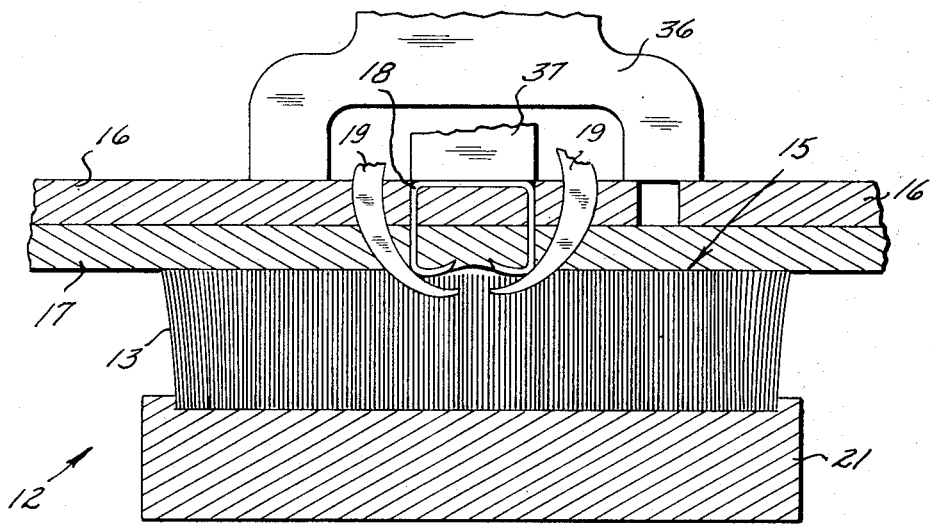
FIGURE 5 is a front elevation section view of a spicular support bed as in FIGURE 4 except that the clinching jaws are shown in closed position extended through the stock layers and clinching the staple into its final fastening position.

In blind stapling, a carton or box 35 is positioned as shown in FIGURES 1, 2, and 3; the flat folded or "knock down" carton 35 is unfolded and placed over the support cushion 12 so that the lower part of the carton 35 rests on the table 29. The outside flaps 16 are folded over the inside flaps 17 to form the box end closure lying flush against the support surface 15 as seen in FIGURE 3. As seen in FIGURES 4 and 5 the stapler 36 is placed against the end closure formed by the positioning of the flaps 16 and 17. Thus the stapler 36 rests against the outer flap 16, and the entire end closure (flaps 16 and 17) is supported by the surface 15. The stapler 36 is then triggered with the following results: A drive bar 37 drives a staple 18 through the flaps 16 and 17 through which are simultaneously driven clinching jaws 19 in a well known manner. The driving mechanism for the clinching jaws 19 is not shown. The result of this action is seen in FIGURE 4 which shows the support surface 15 backing up the stock layers, shown here to be end flaps 16 and 17. The clinching jaws 19 are shown as having passed through the flaps 16 and 17, through the surface 15 and into the bed of spicular elements 13. The jaws 19 have swung inward to a point where they are just embracing the unclinched staple 18 which is shown protruding through the end flaps 16 and 17 and also through the surface 15. The support surface 15 continues to support the box end flaps 16 and 17 even after penetration through them by the staple 18 and clinching jaws 19. This support to the flaps 16 and 17 is uninterrupted because the staple 18 and clinching jaws 19 cause only local deformation of the spicules 13 in the region entered by the clinching jaws 19 and staple 18. The spicules 13 involved in this deformation are such a small proportion of the total number present that a sufficient number of spicles remain erect to give continued vertical support along the axis of each spicule 13 to the material lying on the surface 15 to be fastened, such as the end flaps 16 and 17 shown. Neither FIGURE 4 nor FIGURE 5 actually shows any bending or buckling of the spicules 13 to accommodate the passage and manipulation of the clinching jaws 19 and staple 18. However, local deformation does occur when the manipulation encounters the spicules 13, and after manipulation the spicules 13 spring back in support position.

In FIGURE 5 the stapling operation is seen at a stage advanced from that seen in FIGURE 4. The clinching jaws 19 have been swung inward by the driving mechanism (not shown) of the stapler 36 and have, in the course of this action, bent the legs of the staple 18 through the spicules 13 up against the inner flap 17 into the final clinching position shown.

The sequence of stapler actions shown in FIGURES 4 and 5 is followed by removal of the stapler 36 which withdraws the clinching jaws 19 from the flaps 16 and 17. The staple 18 remains to fasten the flaps 16 and 17 firmly together.

The spicules 13 are resilient and may be plastic, steel, or of other stiff, bristle-like material.

Figure 6:
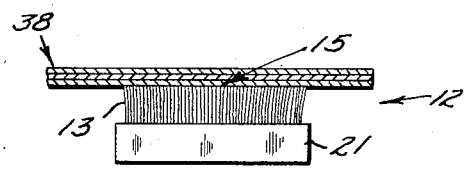
FIGURE 6 is a front elevation partial section of a spicular support bed with a section taken through plural layers of material or stock, showing the spicular support bed in back-up orientation for any type of blind manipulation.

It will be observed that the presently described back-up device, while especially suited to stapling cartons or boxes is by no means confined thereto, and any kind of blind fastening operation, on any kind of material or layers of stock, which requires a resilient, penetrable back-up cushion, is well served by the present invention. FIGURE 6 shows such a case where spicules 13 are providing back-up support, in accord with the present invention, for a plurality of flap layers of stock 38 which are not in any manner related to or associated with a box or carton and which are being supported for any fastening operation such as riveting, stitching, and the like, including but not limited to the stapling operation disclosed in the present above description.

Having thus described a particular embodiment of my invention and the operation thereof other modifications and improvements will be appreciated by those skilled in the art and such modifications and improvements are intended to be included herein limited only by the scope of the hereinafter appended claims.

I claim:

1. In combination with blind staplers of the type having staple clinching jaws which penetrate from one side of plural material layers through to the opposite side thereof, there to clinch a pair of staple legs inwardly and then be withdrawn from said plural layers to leave them in a stapled attachment to one another, a resilient support cushion of sufficient stiffness to support the plural layers and of sufficient resiliency to allow said clinching jaws and staple arms to deflect and penetrate said cushion without mutilating said cushion or substantially diminishing its said supporting stiffness.

2. In combination with blind staplers of the type having staple clinching jaws which penetrate from one side of plural material layers through to the opposite side thereof, there to clinch a pair of staple legs inwardly and then be withdrawn from said plural layers to leave them in a stapled attachment to one another,
  a plurality of discrete, erect, resilient elements of sufficient stiffness to support the plural layers and of sufficient resiliency to allow said clinching jaws to deflect and penetrate between said spicular elements and clinch the arms of said staple.

3. In combination with blind staplers of the type having staple clinching jaws which penetrate from one side of plural material layers through to the opposite side thereof, there to clinch a pair of staple legs inwardly and then be withdrawn from said plural layers to leave them in a stapled attachment to one another,
  (a) a resilient support cushion of flexible upright spicular elements sufficiently stiff collectively to support the plural layers and of sufficient resiliency to deflect before the movement of said clinching jaws and the staple arms being clinched;
  (b) a rigid platform to which said spicular elements are rooted; and
  (c) a support structure for said platform.

4. In combination with blind staplers of the type having staple clinching jaws which penetrate from one side of plural material layers through to the opposite side thereof, there to clinch a pair of staple legs inwardly and then be withdrawn from said plural layers to leave them in a stapled attachment to one another,
  (a) a resilient support cushion of flexible upright spicular elements sufficiently stiff collectively to support the plural layers and of sufficient resiliency to deflect before the movement of said clinching jaws and the staple arms being clinched;
  (b) a rigid platform to which said spicular elements are rooted;
  (c) an elongate vertical post supporting said platform; and
  (d) a base, stabilizing said post in erect vertical position.

5. The structure of claim 4 with the additional structure comprising a table adjustably secured for selected vertical positioning on said vertical post.

6. The method of back-up blind stapling which comprises:
  (a) assembling plural layers of material on a resilient support surface; and
  (b) blind stapling the plural layers by driving a staple and clinching jaws through said layers, the clinching jaws acting on the blind side of the plural layers and penetrating the resilient support cushion, said support cushion being of sufficient stiffness to support the plural layers and of sufficient resiliency to deflect before the movement of said clinching jaws and the staple arms being clinched.

7. The method of blind-side supported stapling comprising:
  (a) assembling plural layers of material on a resilient support of upright spicular elements; and
  (b) blind stapling the plural layers by driving a staple and curved clinching jaws through said layers, the curved clinching jaws acting on the blind side of the plural layers and penetrating the resilient support cushion which has a plurality of upright spicular elements of sufficient stiffness to support the plural layers and of sufficient resiliency to allow said clinching jaws to deflect and penetrate between said resilient spicular elements and clinch the ends of said staple.

References Cited
UNITED STATES PATENTS

| | | | |
|---|---|---|---|
| 1,404,252 | 1/1922 | White | 227—140 |
| 2,478,353 | 8/1949 | Zackerson | 227—154 |
| 2,673,169 | 3/1954 | Finch | 29—526 X |

THOMAS H. EAGER, *Primary Examiner.*